Patented Oct. 14, 1952

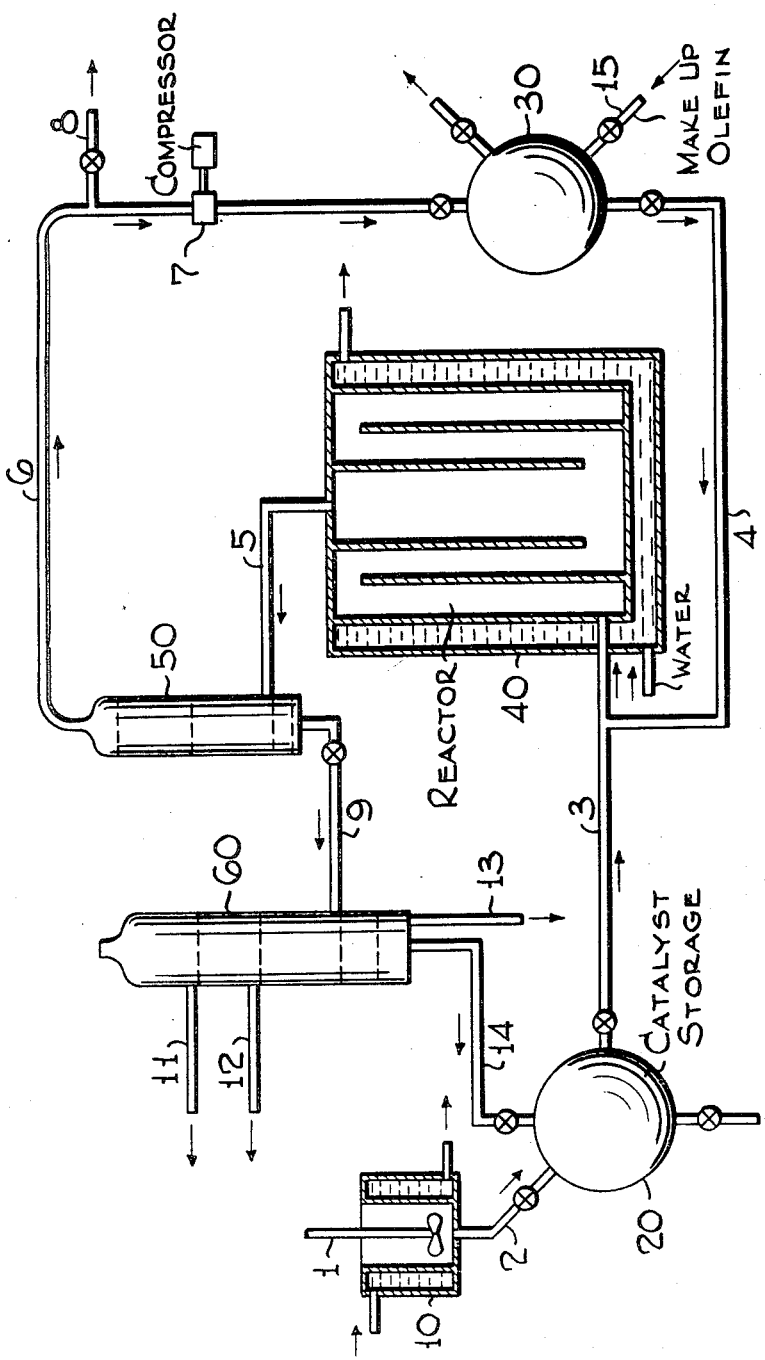

2,614,136

UNITED STATES PATENT OFFICE 2,614,136

METHOD OF POLYMERIZING OLEFINS WITH PHOSPHORUS PENTOXIDE-TRI-ALKYL PHOSPHATE CATALYST SOLUTION

John J. Kolfenbach, Somerville, N. J., and Augustus B. Small, Baton Rouge, La., assignors to Standard Oil Development Company, a corporation of Delaware Application July 6, 1949, Serial No. 103,212

7 Claims. (Cl. 260—683.15)

The present invention is concerned with an improved polymerization catalyst. The invention is more particularly concerned with a catalyst comprising a phosphorus pentoxide and a tri-alkyl phosphate for the polymerization of relatively low molecular weight hydrocarbons to produce hydrocarbons boiling in the motor fuel boiling range. In accordance with the specific adaptation of the present invention, hydrocarbon constituents containing 4 or fewer carbon atoms in the molecule are polymerized to liquid hydrocarbon products boiling below about 650° F. and mostly below about 450° F. by utilizing a catalyst comprising phosphorus pentoxide dissolved in an alkyl phosphate, as for example tributyl phosphate.

It is well known in the art to use various acids of phosphorus for the polymerization of relatively low molecular weight unsaturated hydrocarbons. These acids of phosphorus may be used as such, but are generally employed in conjunction with various carriers such as, diatomaceous earth, silica gel and the like. Various promoters are also used in conjunction therewith. In general the catalyst heretofore used in the art comprise solid catalyst which are utilized in fixed bed or in various slurry types of operation. It has now been discovered that a liquid catalyst comprising phosphorus pentoxide dissolved in an alkyl phosphate is particularly effective. This liquid catalyst is very desirable and possesses many advantages.

The present invention may be readily understood by reference to the attached drawing illustrating one embodiment of the same. For the purpose of illustration it is assumed that the catalyst comprises phosphorus pentoxide dissolved in tributyl phosphate and that the feed stream comprises normally gaseous olefins. The phosphorus pentoxide and the tributyl phophsate are added to catalyst preparation zone 10. Satisfactory mixing is secured by a stirrer 1 or equivalent means. The catalyst is withdrawn from zone 10 by means of line 2 and passed to catalyst storage zone 20. The catalyst is withdrawn from zone 20 by means of line 3 and mixed with a liquid feed comprising olefins which are introduced into line 3 by means of line 4. For the purpose of illustration it is assumed that the liquid feed comprises olefinic constituents containing from 3 to 5 carbon atoms in the molecule. The feed stream is withdrawn from a storage zone 30. The catalyst and the feed stream are introduced into reaction zone 40 under suitable temperature and pressure conditions to produce the desired polymerization. For the purpose of illustration the temperature in zone 40 is maintained at about 150° F. by circulating cooling water.

The reaction product is withdrawn from the top of reaction zone 40 by means of line 5 and introduced into separation zone 50. Unreacted olefinic constituents are withdrawn overhead from zone 50 by means of line 6, compressed in compression zone 7 and preferably reintroduced into storage zone 30. If desired these constituents may be withdrawn from the system by means of line 8.

The reaction product and catalyst are withdrawn from the bottom of zone 50 by means of line 9 and introduced into separation zone 60. Temperature and pressure conditions are adjusted to segregate various polymer streams. For example, the dimer may be removed from zone 60 by means of line 11 while the trimer polymer may be removed from zone 60 by means of line 12. The catalyst is withdrawn from the bottom of zone 60 by means of line 13 and further handled or regenerated as desired. The catalyst also may be withdrawn from the bottom of zone 60 by means of line 14 and recycled by introducing the same into storage catalyst zone 20. Fresh olefinic feed is introduced into the system by means of line 15.

The present invention is broadly concerned with the use of phosphorus pentoxide dissolved in an alkyl phosphate. The alkyl phosphates employed should be liquid at temperatures in the range from 70° F. to 200° F. Furthermore, the alkyl phosphate should have boiling points in excess of about 350° F., preferably in excess of about 400° F. Preferred alkyl phosphates are those wherein the alkyl group contains from 2 to 5 carbon atoms in the radical. It is also very desirable that the alkyl phosphate be a tri-alkyl phosphate. A particularly desirable phosphate comprises tributyl phosphate.

The concentration of the $P_2O_5$ in the alkyl phosphate solution may vary appreciably, as for example from 1 gram of $P_2O_5$ per 100 grams of solvent up to solutions saturated with $P_2O_5$. In general, it is preferred that the concentration of the $P_2O_5$ be in excess of 25% by weight of $P_2O_5$ based upon the weight of solvent present. A particularly effective solution comprises a solution saturated with $P_2O_5$.

The pressure employed in the polymerization operation should be at least sufficient to maintain all constituents in the liquid phase. In general, the pressure is in the range from about 125 to 175 lbs. per sq. in. guage. Temperatures should be in excess of about 50° F. and are preferably in the range from 130° F. to 150° F. It is usually desirable to keep the temperature below about 220° F.

The invention may be more fully understood by the following examples illustrating embodiments of the same:

Example I

Isoprene was contacted with a 35% solution of $P_2O_5$ in tributyl phosphate at a temperature of 94° F. The polymer produced had an average molecular weight of about 270.

Example II 50 grams of saturated solution of phosphorus pentoxide in tributyl phosphate was poured into a 1½ liter bomb. To the bomb was added 845 grams of isobutylene. The bomb was placed in a water bath at 122° F. A strongly exothermic reaction took place almost immediately. The bomb was maintained at 122° F. for 2 hours, after which the contents were distilled. 516 grams of dimer and 112 grams of trimer were formed with practically no materials higher in molecular weight than trimer being formed.

Example III 24 grams of a saturated solution of phosphorus pentoxide in tributyl phosphate was placed in a 1½ liter bomb. 980 grams of isobutylene was added. The flask was immersed in a water bath at 20° C. After reaction the product was distilled and yielded 647 grams of dimer and 219 grams of trimer. Neither tetramer nor heavier materials was formed in any appreciable quantity.

The present catalyst is effective in polymerizing olefinic constituents. In general, the feed streams comprise normally gaseous olefins such as ethylene, propylene, butylenes, pentylenes, and mixtures thereof which are polymerized to hydrocarbon constituents which boil in the range below about 400° F. Although 100% olefinic streams may be utilized as feed stocks, it is generally preferred to have paraffinic diluents present in the range of from about 40% to 90% by weight in order to reduce the formation of carbonaceous deposits on the catalyst and to provide better temperature control in the catalyst bed.

Having described the invention it is claimed:

1. Process for the polymerization of normally gaseous olefins to hydrocarbon constituents boiling in the motor fuel boiling range which comprises contacting a feed stream containing normally gaseous olefins with a liquid catalyst consisting essentially of phosphorus pentoxide dissolved in a tri-alkyl phosphate, said alkyl groups having in the range of 2 to 5 carbon atoms and said catalyst containing above about 1 g. of said phosphorus pentoxide per 100 g. of said tri-alkyl phosphate.

2. Process as defined by claim 1 wherein said tri-alkyl phosphate comprises tributyl phosphate.

3. Process as defined by claim 1 wherein said tri-alkyl phosphate comprises tributyl phosphate and wherein the temperature of reaction is maintained in the range between about 50° F. and 220° F.

4. Process as defined by claim 2 wherein the phosphorus pentoxide is present in a concentration to substantially saturate the tributyl phosphate solution.

5. Process for polymerization of normally gaseous olefins to hydrocarbon constituents boiling in the motor fuel boiling range which comprises, contacting a feed stream comprising said olefins with a liquid catalyst consisting essentially of phosphorus pentoxide dissolved in tributyl phosphate, at a reaction temperature in the range of 50°–250° F., said catalyst containing phosphorus pentoxide in an amount ranging from about 25% by weight based on said tributyl phosphate up to saturation.

6. Process as in claim 5 wherein said olefin is isobutylene.

7. Process as in claim 5 wherein said reaction temperature is in the range of 68°–122° F.

JOHN J. KOLFENBACH.
AUGUSTUS B. SMALL.

REFERENCES CITED

The following references are of record in the file of this patent:

UNITED STATES PATENTS

| Number | Name | Date |
|---|---|---|
| 2,051,859 | Ipatieff et al. | Aug. 25, 1936 |
| 2,055,415 | Malishev | Sept. 22, 1936 |
| 2,182,617 | Michel | Dec. 5, 1939 |
| 2,220,430 | Stanley | Nov. 5, 1940 |
| 2,237,866 | Guinot | Apr. 8, 1941 |
| 2,347,955 | Korpi | May 2, 1944 |
| 2,402,051 | Ipatieff et al. | June 11, 1946 |
| 2,470,904 | Shanley | May 24, 1949 |
| 2,486,533 | Mayland et al. | Nov. 1, 1949 |

FOREIGN PATENTS

| Number | Country | Date |
|---|---|---|
| 340,513 | Great Britain | Dec. 22, 1930 |
| 790,945 | France | Nov. 29, 1935 |